(12) United States Patent
Kelly et al.

(10) Patent No.: US 9,075,894 B2
(45) Date of Patent: Jul. 7, 2015

(54) SYSTEM AND METHOD FOR IDENTIFYING WEB OBJECTS UNWORTHY OF BEING CACHED

(75) Inventors: Thomas J. Kelly, Fergus (CA); Marsha Groves, legal representative, Fergus (CA); Kevin Porter, Guelph (CA); Eric Maki, Kitchener (CA); Marcin Lukasz Lizon, Waterloo (CA)

(73) Assignee: Blue Coat Systems, Inc., Sunnyvale, CA (US)

( * ) Notice: Subject to any disclaimer, the term of this patent is extended or adjusted under 35 U.S.C. 154(b) by 81 days.

(21) Appl. No.: 13/285,481

(22) Filed: Oct. 31, 2011

(65) Prior Publication Data

US 2012/0158815 A1 Jun. 21, 2012

Related U.S. Application Data

(60) Provisional application No. 61/408,738, filed on Nov. 1, 2010.

(51) Int. Cl.
*G06F 15/16* (2006.01)
*G06F 17/30* (2006.01)

(52) U.S. Cl.
CPC .............................. *G06F 17/30902* (2013.01)

(58) Field of Classification Search
CPC .......... G06F 17/30902; G06F 12/1483; G06F 12/0875; G06F 12/0813; G06F 12/0897; G06F 12/123; G06F 12/127; G06F 12/0811; G06F 12/0817; G06F 12/0862; G06F 12/0888; G06F 12/0891; G06F 12/12; G06F 12/01
USPC ..................... 709/201, 203, 225–226; 726/30
See application file for complete search history.

(56) References Cited

U.S. PATENT DOCUMENTS

| 6,587,928 | B1 * | 7/2003 | Periyannan et al. ........... 711/138 |
| 7,447,755 | B1 | 11/2008 | Maxted et al. |
| 7,539,818 | B2 | 5/2009 | Malcolm et al. |
| 7,975,025 | B1 * | 7/2011 | Szabo et al. ................... 709/218 |
| 8,429,715 | B2 * | 4/2013 | Meren et al. ...................... 726/3 |

* cited by examiner

*Primary Examiner* — Douglas W Owens
*Assistant Examiner* — Monica C King
(74) *Attorney, Agent, or Firm* — Ascenda Law Group, PC

(57) ABSTRACT

A caching device is configured to determine whether an object received or currently stored at the caching device should be (or continue to be) cached at the caching device, even if the object is otherwise cacheable. If so, the object is cached (or retained) at the caching device, otherwise, it is not. The determination as to whether or not the object should be cached or, if already cached, retained at the caching device may be made on the basis of a worthiness determination which evaluates the object on the basis of one or more parameters or attributes of the object, which worthiness may be one part of an overall value determination for the object.

24 Claims, 4 Drawing Sheets

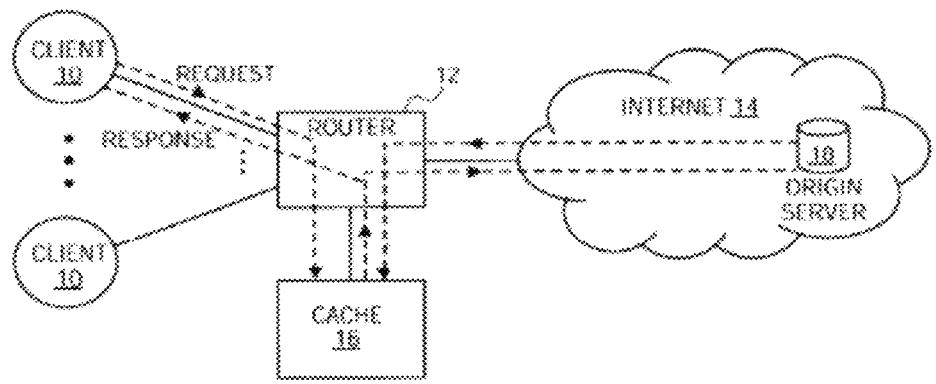
FIG. 1
FIGURE 2
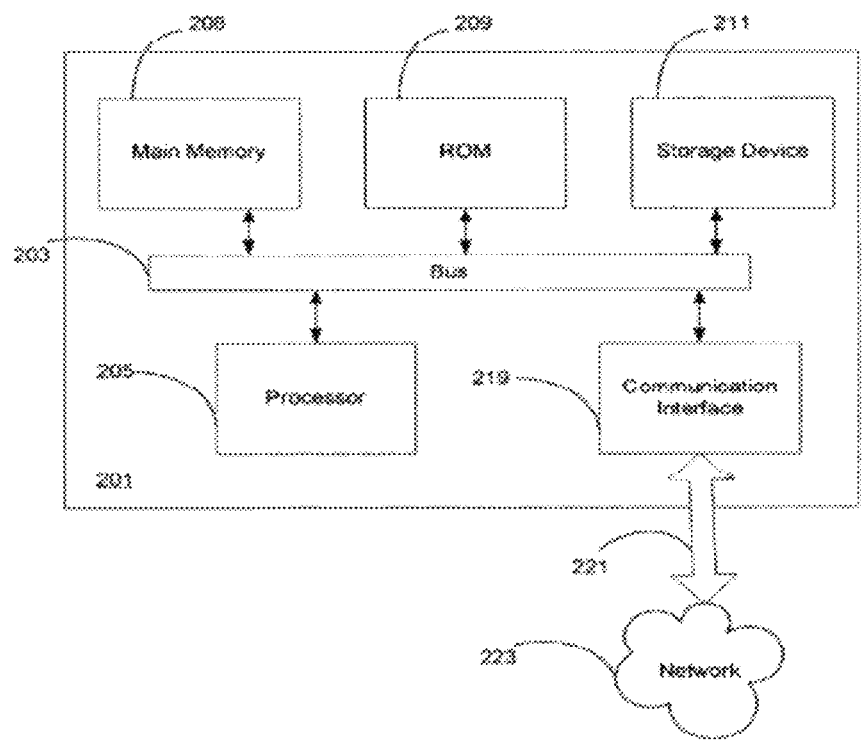

SYSTEM AND METHOD FOR IDENTIFYING WEB OBJECTS UNWORTHY OF BEING CACHED

RELATED APPLICATIONS

This application is a NONPROVISIONAL of, claims priority to, and incorporates by reference U.S. Provisional Application No. 61/408,738, filed 1 Nov. 2010.

FIELD OF THE INVENTION

The present invention relates to methods and systems for determining which, of otherwise cacheable objects, should not be so cached in a network or other cache.

BACKGROUND

FIG. 1 illustrates an example of a client-server transaction across the Internet. One or more clients 10 are connected to Internet 14 through one or more routers 12. Generally, Internet service providers (ISPs) deploy these routers 12 at points of presence (POP) close to their respective users. Often associated with the routers 12 are caches 16. In other cases caches 16 may be deployed independently of a router, for example as part of a proxy server interposed at a gateway to an enterprise network or other closed system.

Regardless of how they are deployed, caches act as information storage devices and generally store content at locations that are physically and/or logically close to users. That way, requests for content that has been previously cached may be serviced from the cache 16, without having to make queries all the way back to an origin server 18 that may be remote from the requesting client. Using caches in this fashion allows requests to be fulfilled more quickly than would be the case if no cache were used and it also helps to reduce congestion within the Internet 14 by reducing the number of requests that must be processed by the origin server 18.

When content (e.g., a web page or the like) is requested for the first time (or for the first time in a predetermined time period, etc.), no replica of that content will be found in cache 16. Nevertheless, the router 12 (if present) will pass the request from one of the clients 10 to the cache because such routers are generally configured by their operators to pass all requests to one or more associated caches (which may be grouped in a hierarchical fashion) before passing the request to the origin server. Where the content is not found in the cache 16, the cache 16 will fetch the content from the origin server 18. Upon receiving a reply from the origin server 18, the router 12 will forward a copy of the content to the cache 16, which will send the object to the requesting client 10 and store a copy of the object if it is a cacheable object. This way, the cache 16 is updated so that later requests for the same content can be serviced from the cache 16 without need to query the origin server 18. This stored replica of the content may be updated periodically, depending on the refresh policies of the cache 16 and the stored content.

As mentioned above, it is common for caches not to cache some forms of content. For example, content that varies depending on user input (e.g., the output of a common gateway interface (cgi) or other script) or content that is designated confidential or is encrypted is not typically cached. In U.S. Pat. No. 6,587,928, which is assigned to the assignee of the present invention, methods and systems for recognizing requests as being made for cacheable or non-cacheable objects, according to information included in a Uniform Resource Locator (URL) associated with the object, are described. However, to date there have not been implemented systems and methods for dealing with objects that are otherwise cacheable, but which still should not be cached (e.g., because doing so would be an inefficient use of cache resources, etc.).

SUMMARY

Methods and systems for determining which, of otherwise cacheable objects, should not be so cached in a network or other cache or proxy server, etc. are described herein. In accordance with embodiments of the present invention, proxies, caches and/or other devices which are configured to reside logically between clients and servers and to store content, are configured to determine whether or not to so store content items (e.g., objects) which are otherwise cacheable (i.e., are not designated as non-cacheable or are not themselves subject to frequent updates which militates against their being so cached), because they are accessed infrequently or at least not so frequently as to make the caching of such content items desirable.

A caching device is configured to determine whether an object received or currently stored at the caching device should be (or continue to be) cached at the caching device, even if the object is otherwise cacheable. If so, the object is cached (or retained) at the caching device, otherwise, it is not. The determination as to whether or not the object should be cached or, if already cached, retained at the caching device may be made on the basis of a worthiness determination which evaluates the object on the basis of one or more parameters or attributes of the object, which worthiness may be one part of an overall value determination for the object.

BRIEF DESCRIPTION OF THE DRAWINGS

The present invention is illustrated by way of example, an not limitation, in the figures of the accompanying drawings, in which, FIG. 1 illustrates an example of a client-server transaction that includes a caching device logically disposed between the client and server;

FIG. 2 illustrates a data processing system that can be configured as a proxy server or other caching device consistent with embodiments of the present invention.

DESCRIPTION

Figure 3A:
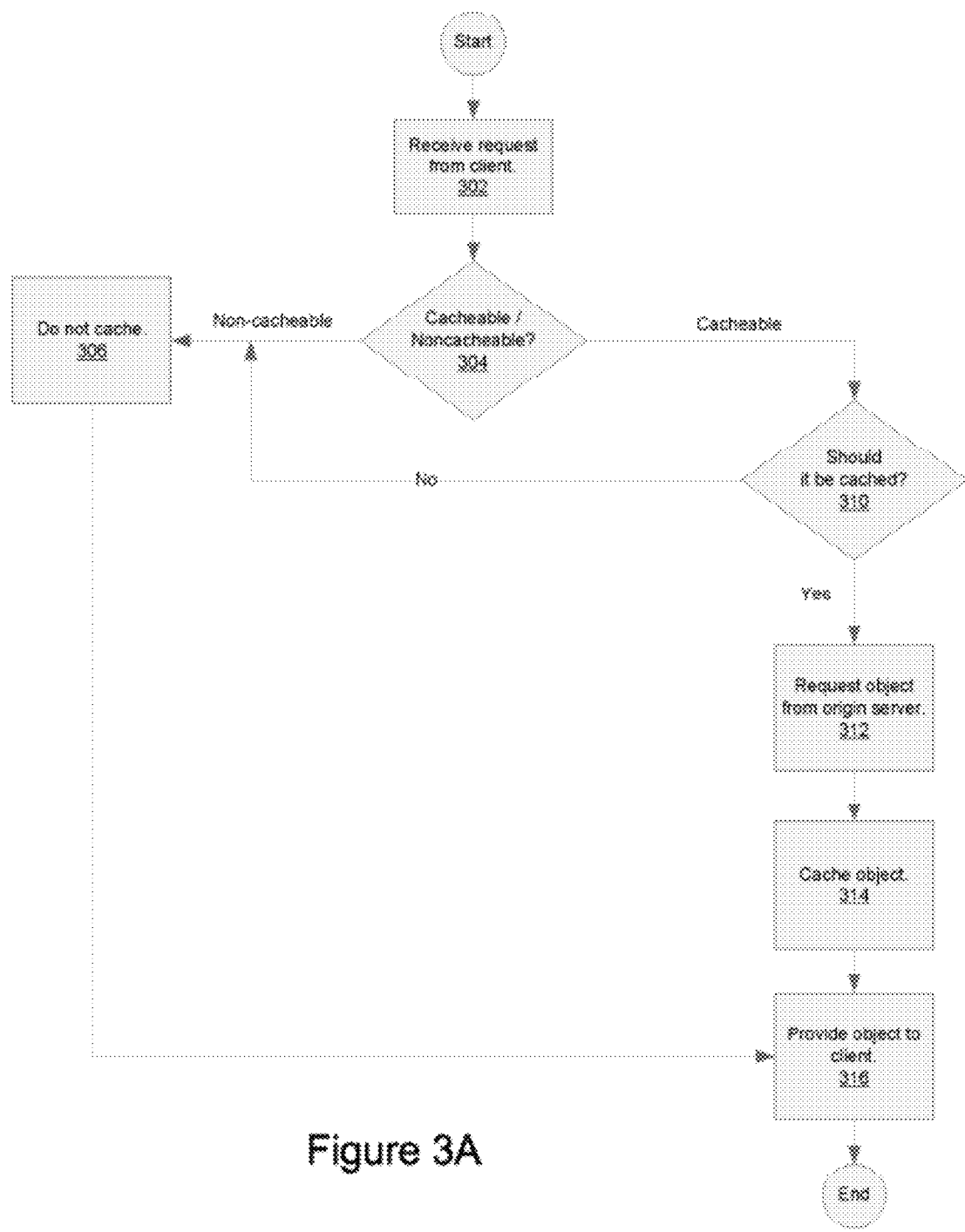
FIGS. 3A, 3B and 3C illustrate examples of processes executed by proxy servers or other caching devices for caching or not caching one or more content items consistent with embodiments of the present invention.

Disclosed herein are methods and systems for determining which, of otherwise cacheable objects, should not be so cached in a network or other cache or proxy server, etc. The inventors have determined that many content items (such as web objects and the like), which are otherwise cacheable (i.e., are not designated as non-cacheable or are not themselves subject to frequent updates which militates against their being so cached), should not be cached, for example because they are only ever accessed once or are only accessed once during their time to live period, or because even though the subject objects may, with reasonable probability, be accessed more than once (or more than once during a time to live period), the subject objects are of a size or "value" such that it would be an inefficient use of cache resources to store the objects. Thus, the present invention recognizes that caching objects imposes burdens on a caching system (e.g., because these objects must be written to disk, consuming disk and processor resources, etc.), and seeks to limit the inefficient commitment of these resources by undertaking evaluations of whether or not to commit these resources in light of characteristics of the subject objects and other factors, as discussed in greater detail below. The objects are cached or not, or, if already cached, retained in cache or evicted therefrom, according to the outcome of these decisions.

As used herein, the terms cache, caching device, proxy, etc., are meant to describe and/or refer to a device that resides logically between a client and server, or other content source, and that stores information flowing there-between in some manner. Such devices may be physically co-located with clients, routers, switches and/or servers and/or may be stand-alone devices. Data streams from the source are received at the device and from there are routed to the requesting clients. En route, each stream can be buffered (stored) and such buffered information can be used to satisfy a number of requests for the content without need for reference back to the original content source. Further, the term object is intended to refer to not just an object in a traditional programming sense, but any content item which a caching device may, in appropriate circumstances, store for later retrieval by one or more clients. By "object" we mean complete objects or portions thereof that are effectively served from a content source (and/or a cache) on their own. In some instances, the determination about whether or not to cache (or retain in storage) an otherwise cacheable object may be made solely with respect to a portion of an object and not to other portions of the object. Or, worthiness, policy or other considerations may require that for objects deemed worthy of being cached, only portions thereof actually be cached.

FIG. 2 is a diagram of a data processing system 201 that can be configured as a proxy server or other caching device consistent with an embodiment of the present invention. Data processing system 201 includes a bus 203 or other communication mechanism for communicating information, and one or more processors 205 coupled with bus 203 for processing the information. Also included is a main memory 208, such as a random access memory (RAM) or other dynamic storage device, coupled to bus 203 for storing information and instructions to be executed by processor 205. In addition, main memory 208 may be used for storing temporary variables or other intermediate information during execution of instructions to be executed by processor 205. System 201 further includes a read only memory (ROM) 209 and/or other computer-readable storage device(s) (such as a hard disk, compact disk read-only memory (CD-ROM), programmable ROM (PROM), erasable PROM (EPROM), and/or FLASH-EPROM, etc.) coupled to bus 203 for storing static information and instructions for processor 205. A storage device 211 is provided and coupled to bus 203 for storing objects retrieved by system 201.

According to one embodiment of the invention, processor 205 executes one or more sequences of one or more instructions contained in main memory 208. Such instructions may be read into main memory 208 from another computer-readable storage medium, such as ROM 209, and execution of those instructions causes processor 205 to perform the processes described herein. In alternative embodiments, hard-wired circuitry may be used in place of or in combination with software instructions. System 201 also includes a communication interface 219, coupled to bus 203, for providing a two-way data communication coupling to a network link 221 that is connected to a local area or other network 223.

System 201 thus includes read/write memory and mass storage (e.g., a plurality of disk drives) for maintaining network objects requested by clients communicatively coupled thereto. Those network objects are served to the client devices upon request. When the storage device becomes sufficiently full, the system removes network objects from storage according to a protocol for such removal. Further details regarding the manner in which network objects are stored by system 201 may be found in U.S. Pat. No. 7,539,818, which is assigned to the assignee of the present invention and incorporated herein by reference. For purposes of the present invention, it is sufficient to recognize that the device implements a delayed write technique, in which cached objects (including copies of objects which are new versions of old objects already present in storage) are written first into memory, and then later written out to a mass storage device, such as a storage device 211.

As indicated above, the inventors have determined that many, if not most, objects cached by proxy servers are only ever referenced infrequently (e.g., once). That is, despite the fact that cacheable objects are commonly stored by proxies, ready to be served in response to subsequent requests, some of those cached objects are, for the most part, never reused because no such subsequent requests for those objects are ever received (at least, not within the time to live or refresh period of the cached object). This is wasteful inasmuch as caching these objects in the first instance requires the expenditure of processor, memory and disk resources (or, more generally, device resources), which could better be used for other purposes. Further, some objects that are accessed more than once (or more than once in a time to live period) may be of small size or have other attributes that suggest storing such objects is inefficient or wasteful of cache resources.

In accordance with the present invention then, those objects which are otherwise cacheable, but which are determined to be unlikely to be the subject of or needed for servicing subsequent requests, are not cached by a proxy or other caching device intermediate one or more clients and one or more servers. This enhances the overall capacity of the caching system because the effective or apparent capacity of that system is increased over its present state. By caching fewer objects, the available space left to cache those objects which are likely to be the subject of subsequent requests that can be serviced from the cache is, effectively, increased.

Identifying those otherwise cacheable objects that should not be cached is not always straightforward. In one embodiment of the invention, tokens or identifiers associated with the objects are used to make classification decisions. Such tokens may come in a variety of forms. For example, tokens may be (or may be derived from) strings extracted from URLs, headers, trailers, tags or other portions of an object, or data associated with an object, or signatures of objects. Further tokens may be (or be derived from) strings extracted from object names, locators, addresses, meta-information (e.g., HTTP (Hyper Text Transfer Protocol) URLs, headers, trailers, etc.) or other portions of the object, or data associated with the object, or signatures of the object; and/or some or all of strings extracted from web protocol Uniform Resource Locators (URLs), HTML (Hyper Text Markup Language) or XML (eXtendable Markup Language) tags or web object semantic content, or other portions of a web object, data associated with a web object, or signatures of a web object. Alternatively, or in addition, tokens may represent content-filter categories for a request and/or an object, which categories are themselves the product of a probabilistic determination based on external filtering and are stored in databases accessible to the caching device. Potentially useful tokens might even include information about or obtained from the requesting client (e.g., IP address, user-agent, etc.) or the time of day, client access patterns (e.g., for a particular object, a class of objects, or simply generally), client behavior for a subject object, class of objects, or simply generally, information regarding a client request received at the caching device, duration (or expected duration) of the subject transaction, speed of data transfer involved in the subject transaction, nature of the client request, and even the identity of the client requesting the object, to name a few. Regardless of how they are determined, the tokens (or a subset thereof) may be stored in one or more databases and made available to the caching systems through publication (e.g., in a push model of distribution) or in response to requests therefore from the caching systems (e.g., a pull model of distribution). These databases may associate resource names with semantic categories for that resource and/or with worthiness determinations (described in greater detail below) for the associated object/resource.

The tokens may thus be used in classifying the associated object as likely to be the subject of a subsequent request or not likely to be the subject of a subsequent request. If an object is classified as the former, and it is determined to be otherwise cacheable, it is cached, otherwise, it is not cached (even if it would otherwise be cacheable). Such a filtering process may rely on the tokens themselves and/or statistical observations with respect to the tokens. For example, Bayesian filters may be employed to perform such analyses.

In one particular embodiment of the invention, when a proxy or other caching device observes a request for an object that is not already present in its cache, the proxy downloads a first portion of the object (e.g., the first 8K bytes of the object) and looks for tokens within that first portion so downloaded. The tokens may be those associated with or compiled by cache/no cache filters (e.g., Bayesian filters). In general, a combination of contingent probabilities associated with a specified set of tokens detected or absent from the downloaded object then informs the cache/no-cache decision. If the object is to be cached, the remainder of the object is downloaded and stored. Otherwise, the object is not cached by the device.

The token files used by the filters may be derived from object access patterns. Such patterns may be derived from data resident at the subject caching device and/or from data obtained from other caching devices or other resources. For example, access logs or other information compiled by or obtained from existing caching devices may be examined to determine which objects are or are likely to be the subject of more than one request therefor and tokens (e.g., hashes) created to represent those objects. For example, caches may employ predictive algorithms to anticipate requests for content (e.g., based on observed traffic) and produce token files accordingly. The tokens may then be stored in a database for use by the filters. Each caching appliance may have its own database or two or more caching appliances may use a common remote database for such filtering operations. In some cases, the token database used by one caching appliance may be shared with other caching appliances in a hierarchy or other arrangement. In any or all of such arrangements, the token databases may be updated periodically to reflect those objects which are determined to be the subject of more than one time requests.

An additional refinement of this process may be to categorize the tokens into more than two categories. For example, tokens may be classified as likely to be for one-time requests, for a few requests and for many requests, with the objects associated with one-time requests not being cached, the objects associated with a few requests being cached but marked for relatively early deletion, and the objects associated with many requests being cached for longer periods than those likely to be associated with only a few requests. Of course, other classification and caching schemes are also possible.

Figure 3B:
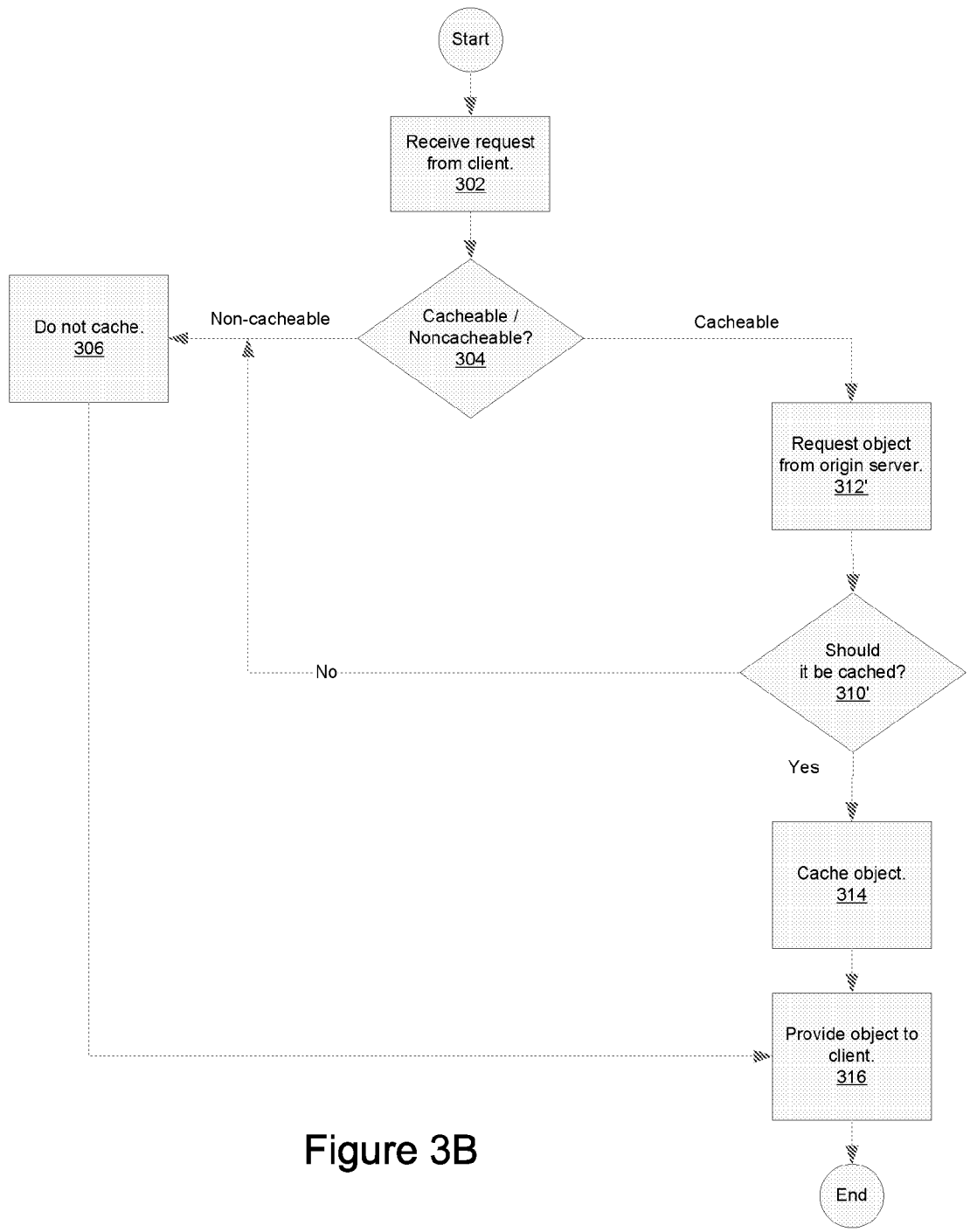
Figure 3C:
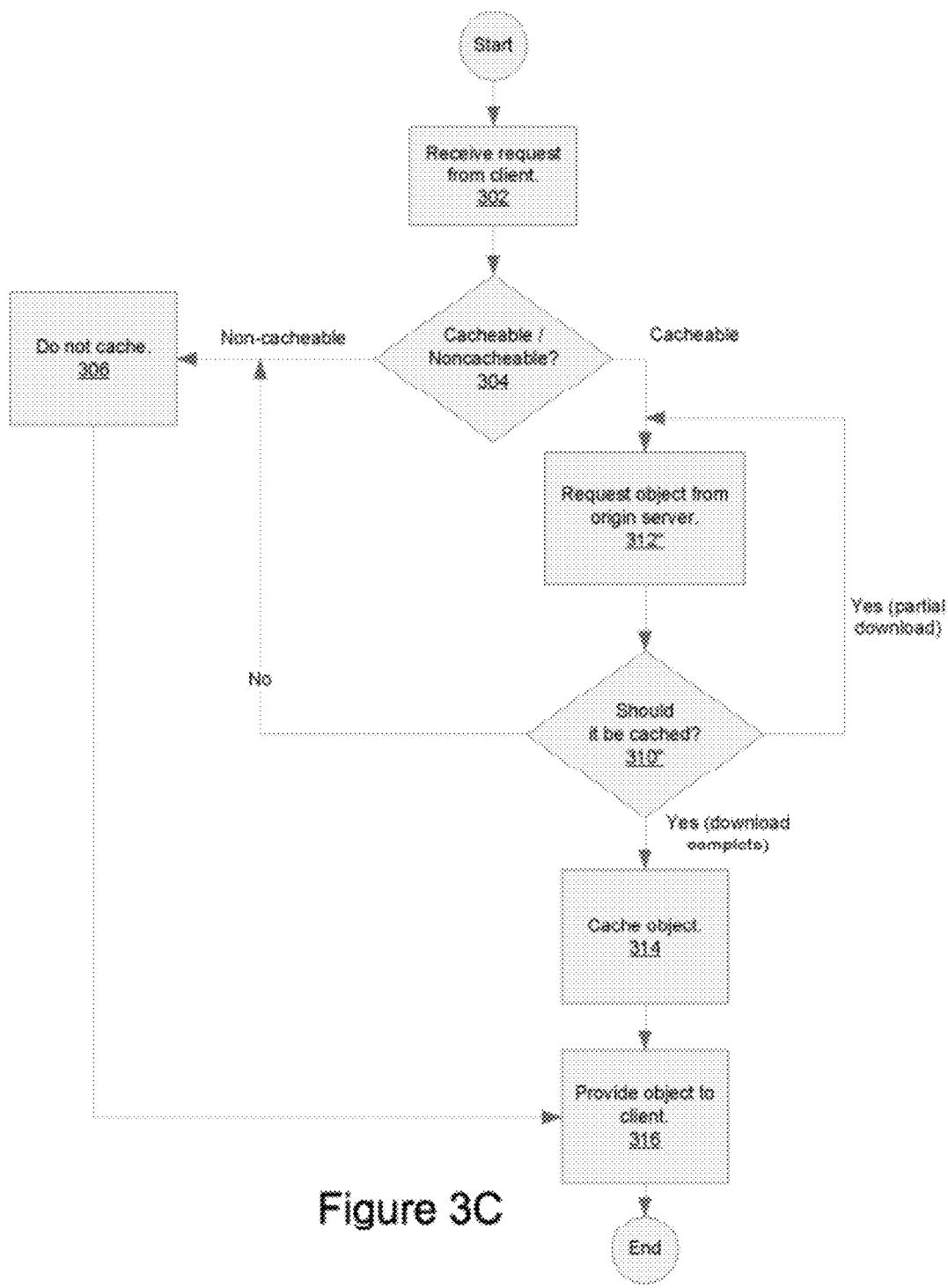

Turning now to FIGS. 3A-3C, some further details regarding the present solution to the basic problem outlined above can be stated. As shown in FIG. 3A, in a network configuration such as that shown in FIG. 1, when a router 12 receives a request from a client (step 302), the request is passed to the caching device, which checks to determine whether the request is for a cacheable or non-cacheable object (step 304). If the request is for a non-cacheable object, no copy of the object is stored at the cache (step 306) when it is returned by the origin server 18 (step 316). However, where the request is for a cacheable object, the caching device makes a second determination as to whether, even though the object is cacheable, the object should be cached (step 310) and, if so, requests the object (step 312), caches it (step 314) and provides a copy to the requesting client (step 316). Notice that in the example shown in FIG. 3B, the decision about whether to cache an object (step 310') is delayed until some or all of the object is requested and downloaded from the content source (step 312') and FIG. 3C shows yet a further approach where the decision about whether or not to cache the object (step 310") is an iterative one, in which prior decisions to cache an object are reevaluated (e.g., while the object is being downloaded from the content source) and may be changed during the download process (step 312"). Such determinations may be made on the basis of any or all of the criteria and/or methodologies described above.

More generally, the determination about whether or not to cache an otherwise cacheable object may involve the use of an adaptive, multi-input, stateful system of classification and scoring. Such a system (which may in some cases be instantiated as the processing unit of the caching device executing appropriate computer instructions read from memory) may compute a function of weighted parameters concerning the subject object and base its decision about whether or not to cache the subject object on the basis of the resulting score. This function (or more particularly the weights of the various parameters evaluated as part of the function) may be updated from time to time, according to an assessment of how accurately the scores of prior decisions reflected the actual need for objects that were the subjects of those prior decisions to be retrieved (or not) from cache. That is, the function may be updated to ease the storing requirement in the event the subject cache is not storing items which are in fact receiving multiple client requests, or to make it more stringent in the event the cache is still storing objects that are not receiving a sufficient number of client requests to make the storage of those objects worth while.

We therefore introduce the term "worthiness" to mean a measurement of the potential (or, perhaps, expected or anticipated) value of en-caching a specific content item. If worthiness is an accurate metric, then it will be higher for objects that are more likely to result in bandwidth savings, because they are more expected to yield subsequent cache hits. As alluded to above, caches typically cannot or do not retain all content items for unbounded lengths of time, so worthiness may be relative to a retention time or residence interval for the content item (which may, in turn, be affected by other attributes of the content item, such as its size or origin). Another way to look at this is that high worthiness is a factor that should induce a longer residence time in cache, because the more worthy an object is, the more potential benefit can be derived from devoting storage resources to it.

Worthiness need not simply be a binary metric (i.e., worthy or unworthy), but may in some instances be determined on the basis of a probability. Further, one should not confuse a determination of cache worthiness with the ultimate en-cache or do not en-cache decision. While worthiness may, in some circumstances, be a significant factor to consider in the ultimate en-caching determination, policy considerations other than or in addition to worthiness may determine the ultimate decision. For example, in some cases, a policy that requires all video objects to be cached, even if they are unlikely to be accessed again within their time to live (e.g., because the bandwidth required to download such items from the origin server is so great) may override a determination that such an object is not worthy of being cached. Conversely, policies or other factors, including resource availability, could result in a decision to reject the caching of objects of otherwise high worthiness.

In considering the overall "value" (or expected value) of a subject content item then, worthiness is just one input. Worthiness may increase or decrease the value of an object relative to similar objects. For example, larger objects (which are more expensive to re-acquire) may have a higher base value, and thus the decision not to cache such an object might require a lower worthiness score than for an object of smaller size.

In still further embodiments, worthiness may be regarded as the equivalent of "value". That is, in some instantiations a single "expected utility" score, and (perhaps) size, time to acquire, and/or other resource metrics may be part of the multi-input worthiness computation. Regardless of the computational details, however, what matters is that a score is produced and that score is compared against a threshold to determine whether or not an otherwise cacheable object is, in fact, cached (i.e., caching or not caching the object on the basis of the outcome of the comparison).

Returning to the flow diagrams of FIGS. 3A-3C, if the object should not be cached (e.g., because it is not likely to be one that will be requested again, at least not within its time to live period), then no copy of the object is cached when it is returned from the origin server (step 306), although a copy is still provided to the requesting client (step 316). However, if the object is determined likely to be the subject of a subsequent request, then the cache stores a copy of the object upon receipt (step 314) and provides same to the requesting client (step 316).

In some instances, the decision about whether to cache an object or not may not be made until well into the processing of a transaction, perhaps not until the whole object has been served to a client (see, e.g., U.S. Pat. No. 7,447,755, assigned to the assignee of the present invention). The object may be cached for an indeterminate period of time, or for a time indicated by a time to live, or for some other time consistent with the type or status of the object and/or the amount of available storage space at the caching device. In this scheme, the determination as to whether the request is for a cacheable or non-cacheable object (step 304) may be made depending upon the port number on which the request is made.

Further, worthiness can be computed when an object is requested and found not to be in cache—that is, a determination of an object's actual worthiness need not be a stateless computation based on just the request itself, but may take into account stateful awareness of the totality of the cache and its resource availability. Limited cache resources would only be made available to objects that have high worthiness scores, while those with low scores would not be retained. Conversely, if the cache is relatively empty, objects with what might be considered marginal worthiness might be stored because doing so does not unduly affect overall cache resource availability.

If an object is en-cached, its worthiness score may be stored with the object, and that information used in connection with later decisions to retain the object or evict it from the cache. Indeed, worthiness may be periodically recomputed and the existing and new worthiness scores compared and used as a basis for retain/evict decisions. An object considered especially worthy when en-cached might get a bonus when worthiness is recalculated; alternatively it might be subject to higher expectations, so if its worthiness drops it would be subject to faster eviction. Thus, a determination of cache worthiness (and the ultimate decision to cache or not cache) need not occur only at the time of en-cachement. Similar decisions may be made periodically as part of or in lieu of other cache eviction or clean-up policy determinations. For example, such a decision may be made when a specific disk sector occupied by a subject object is examined for possible recovery. Likewise, such determinations may be made repeatedly during resolution of a request transaction (for example, if a request is aborted or abandoned by a client, that abandonment might immediately affect the worthiness of the object in question, and, for example, cause a cache to discard an object it had started to acquire).

Insofar as the forgoing discussion relates to entire objects to be cached or not, it may be equally applicable to portions of those objects. For example, many objects are today cached piecemeal and the present methods and systems concerning worthiness and, ultimately, caching decisions may be applied to some or all of such object pieces. Further, the caching determination may be segregated between a stateless, feature-based classifier that accumulates knowledge and assigns worthiness tokens in the fashion discussed above for objects that can be sorted on such bases, and a stateful system for objects that are relatively featureless, but which have a rich and/or complex transactional life cycle. Movies and other large objects are examples of the latter type of objects and tend to look the same to a cache from an attribute point of view, but whose true nature emerges from a pattern of access. Such systems may operate independently, or one may provide an input to the other to produce an overall worthiness determination. Hence, as indicated above, criteria for determining whether or not an otherwise cacheable object received at a caching device should be cached at the caching device may be derived from one or more of: object access patterns, client access patterns, client behavior for a subject object, client behavior for a subject object class, information regarding a client request received at the caching device, time of day, duration of a client transaction, speed of data transfer, nature of a client request for the object, and identity of a client requesting the object.

Thus, methods and systems for determining which otherwise cacheable objects should not be cached in a network or other cache or proxy server, etc., have been described. Although discussed with reference to certain illustrated embodiments, upon review of this specification, those of ordinary skill in the art will recognize that the present scheme may find application in a variety of systems, perhaps with one or more minor variations. Therefore, in the description of the illustrated embodiments should be regarded as exemplary only and should not be deemed to be limiting in scope.

What is claimed is:

1. A computer-implemented process, comprising:
   determining, according to one or more criteria, whether or not an otherwise cacheable object received at a caching device should be cached at the caching device; and
   if so, caching the object at the caching device, otherwise, not caching the object at the caching device, wherein the one or more criteria consider a cache worthiness of the object in combination with a resource availability of the caching device, and wherein when the resource availability of the caching device is high, objects with a low cache worthiness are allowed to be cached in the caching device and when the resource availability of the caching device is low, only objects with a high cache worthiness are allowed to be cached in the caching device.

2. The computer-implemented process of claim 1, wherein the one or more criteria comprise one or more tokens.

3. The computer-implemented process of claim 2, wherein the one or more tokens comprise some or all of strings extracted from Uniform Resource Locators (URLs), headers, trailers, tags or other portions of the object, or data associated with the object, or signatures of the object.

4. The computer-implemented process of claim 2, wherein the one or more tokens comprise some or all of strings extracted from object names, locators, addresses, meta-information or other portions of the object, or data associated with the object, or signatures of the object.

5. The computer-implemented process of claim 4, wherein strings extracted from object names, locators, addresses, meta-information or other portions of the object comprise one or more of strings extracted from HTTP URLs, headers or trailers.

6. The computer-implemented process of claim 2, wherein the one or more tokens comprise some or all of HTML or XML tags or web object semantic content, or other portions of a web object, data associated with a web object, or signatures of a web object.

7. The computer-implemented process of claim 2, wherein the one or more tokens are provided to the caching device from one or more databases accessible to the caching device.

8. The computer-implemented process of claim 7, wherein some or all of the tokens are used in classifying the object as not likely to be the subject of a subsequent request.

9. The computer-implemented process of claim 8, wherein the caching device determines whether or not to cache the object according to statistical observations with respect to the tokens.

10. The computer-implemented process of claim 1, wherein the otherwise cacheable object was previously stored at the caching device, at least in part, prior to determining whether or not the otherwise cacheable object should be cached at the caching device.

11. The computer-implemented process of claim 10, wherein determining whether or not the otherwise cacheable object should be cached at the caching device is repeated iteratively while portions of the object not previously cached by the caching device are downloaded to the caching device.

12. The computer-implemented process of claim 2, wherein the tokens are derived from one or more of: object access patterns, client access patterns, client behavior for a subject object, client behavior for a subject object class, information regarding a client request received at the caching device, time of day, duration of a client transaction, speed of data transfer, nature of a client request for the object, and identity of a client requesting the object.

13. A caching device comprising a processor and a storage device communicatively coupled to said processor, said storage device storing computer-executable instructions which, when executed by the processor, cause the processor to perform the steps of:

determining, according to one or more one or more criteria, whether or not an otherwise cacheable object received at the caching device should be cached at the caching device; and if so, caching the object at the caching device, otherwise, not caching the object at the caching device, wherein the one or more criteria consider a cache worthiness of the object in combination with a resource availability of the caching device, and wherein when the resource availability of the caching device is high, objects with a low cache worthiness are allowed to be cached in the caching device and when the resource availability of the caching device is low, only objects with a high cache worthiness are allowed to be cached in the caching device.

14. The caching device of claim 13, wherein the one or more criteria comprise one or more tokens.

15. The caching device of claim 14, wherein the one or more tokens comprise some or all of strings extracted from Uniform Resource Locators (URLs), headers, trailers, tags or other portions of the object, or data associated with the object, or signatures of the object.

16. The caching device of claim 14, wherein the one or more tokens comprise some or all of strings extracted from object names, locators, addresses, meta-information or other portions of the object, or data associated with the object, or signatures of the object.

17. The caching device of claim 16, wherein strings extracted from object names, locators, addresses, meta-information or other portions of the object comprise one or more of strings extracted from HTTP URLs, headers or trailers.

18. The caching device of claim 14, wherein the one or more tokens comprise some or all of HTML or XML tags or web object semantic content, or other portions of a web object, data associated with a web object, or signatures of a web object.

19. The caching device of claim 14, wherein the one or more tokens are provided to the caching device from one or more databases accessible to the caching device.

20. The caching device of claim 14, wherein some or all of the tokens are used in classifying the object as not likely to be the subject of a subsequent request.

21. The caching device of claim 20, wherein the caching device determines whether or not to cache the object according to statistical observations with respect to the tokens.

22. The caching device of claim 13, wherein the otherwise cacheable object was previously stored at the caching device, at least in part, prior to determining whether or not the otherwise cacheable object should be cached at the caching device.

23. The caching device of claim 22, wherein determining whether or not the otherwise cacheable object should be cached at the caching device is repeated iteratively while portions of the object not previously cached by the caching device are downloaded to the caching device.

24. The caching device of claim 13, wherein the criteria are derived from one or more of: object access patterns, client access patterns, client behavior for a subject object, client behavior for a subject object class, information regarding a client request received at the caching device, time of day, duration of a client transaction, speed of data transfer, nature of a client request for the object, and identity of a client requesting the object.

* * * * *